(12) United States Patent
Hirato

(10) Patent No.: US 8,064,011 B2
(45) Date of Patent: Nov. 22, 2011

(54) DISPLAY PANEL AND DISPLAY DEVICE HAVING FOREIGN-MATTER BLOCKING COUNTER ELECTRODE

(75) Inventor: Shinichi Hirato, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 223 days.

(21) Appl. No.: 12/303,217

(22) PCT Filed: Jun. 7, 2007

(86) PCT No.: PCT/JP2007/061536
§ 371 (c)(1),
(2), (4) Date: Dec. 2, 2008

(87) PCT Pub. No.: WO2008/047497
PCT Pub. Date: Apr. 24, 2008

(65) Prior Publication Data
US 2009/0257009 A1    Oct. 15, 2009

(30) Foreign Application Priority Data
Oct. 17, 2006   (JP) .................................. 2006-283130

(51) Int. Cl.
*G02F 1/1333* (2006.01)
(52) U.S. Cl. ........................................ 349/110; 349/139
(58) Field of Classification Search ........................ None
See application file for complete search history.

(56) References Cited

U.S. PATENT DOCUMENTS

| | | | |
|---|---|---|---|
| 5,936,693 A | 8/1999 | Yoshida et al. | |
| 7,136,140 B1 | 11/2006 | Inoue et al. | |
| 7,492,435 B2 * | 2/2009 | Jeon | 349/155 |
| 7,554,630 B2 * | 6/2009 | Kwon et al. | 349/111 |
| 2002/0018149 A1 | 2/2002 | Kanayama | |
| 2004/0075798 A1 | 4/2004 | Inoue et al. | |
| 2005/0018111 A1 * | 1/2005 | Tak | 349/110 |
| 2006/0092366 A1 | 5/2006 | Inoue et al. | |
| 2006/0098151 A1 | 5/2006 | Inoue et al. | |
| 2007/0146608 A1 * | 6/2007 | Jin et al. | 349/143 |
| 2007/0258026 A1 | 11/2007 | Sumi | |

FOREIGN PATENT DOCUMENTS

| | | |
|---|---|---|
| JP | 6-118447 A | 4/1994 |
| JP | 8-262426 A | 10/1996 |
| JP | 8-334753 A | 12/1996 |
| JP | 11-202320 A | 7/1999 |
| JP | 11-212074 A | 8/1999 |
| JP | 11-271775 A | 10/1999 |
| JP | 2001-83517 A | 3/2001 |
| JP | 2001-281693 A | 10/2001 |

* cited by examiner

*Primary Examiner* — Richard Kim
(74) *Attorney, Agent, or Firm* — Birch, Stewart, Kolasch & Birch, LLP

(57) ABSTRACT

A CF substrate (2) is designed such that at an area of a black matrix (22) that is closer to a TFT substrate (1), a counter electrode (24) does not cover at least a part of a first area that faces source lines (13). Consequently, even when a foreign matter (13a) attaches to the source line (13), it is possible to prevent the foreign matter (13a) from contacting the counter electrode (24). This allows realizing a display panel and a display device in which electric leakage between a line electrode and a counter electrode is prevented even when a foreign matter attaches to a line electrode and a counter electrode.

6 Claims, 8 Drawing Sheets

FIG. 6
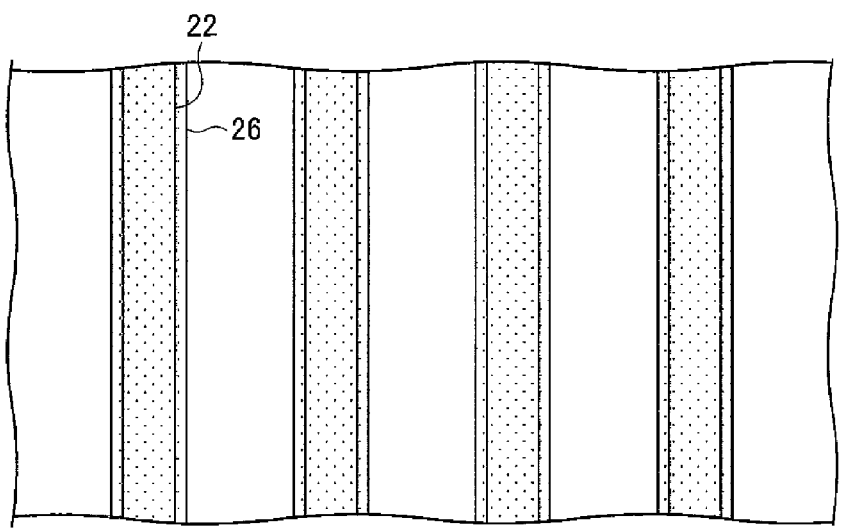
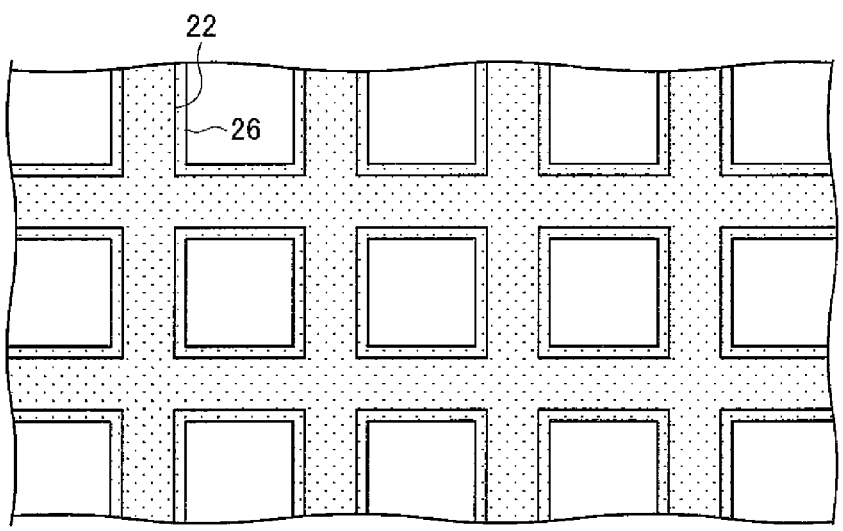

US 8,064,011 B2
1

DISPLAY PANEL AND DISPLAY DEVICE HAVING FOREIGN-MATTER BLOCKING COUNTER ELECTRODE

TECHNICAL FIELD

The present invention relates to a configuration of a display panel in a display device such as a liquid crystal display device, which configuration allows avoiding defective production.

BACKGROUND ART

In an active matrix liquid crystal display panel that performs color display, data signal lines and scanning signal lines provided on a TFT substrate and portions of counter electrodes provided on a CF (color filter) substrate to be on a black matrix region are positioned to face each other.

As an example, FIG. 9 illustrates a cross sectional drawing of a liquid crystal display panel in a MVA (Multi-domain Vertical Alignment) mode described in Patent Document 1, taken along a line perpendicular to a direction in which data signal lines extend.

In the liquid crystal display panel, the TFT substrate is configured such that gate electrodes (scanning signal lines) made of aluminum etc. (not shown) are formed on a glass substrate 124 and a gate insulating film 136 of approximately 400 nm in thickness is formed on the gate electrodes. Data signal lines 112 of approximately 150-350 nm in thickness are formed on the gate insulating film 136, and a passivation film 130 of approximately 330 nm in thickness for covering the TFT is formed on the data signal lines 112. ITOs (transparent electrodes) of approximately 50-150 nm in thickness, serving as pixel electrodes 116, are formed on the passivation film 130, and an alignment film 132 of approximately 30-120 nm in thickness is formed in order to cover the passivation film 130 and the pixel electrodes 116.

Further, the CF substrate is configured such that black matrixes 134 made of chrome are formed on a glass substrate 122 to have a thickness of approximately 100-200 nm, and color filters R, G, and B are formed on the glass substrate 122 to have a thickness of approximately 0.9-2.5 μm. ITOs of approximately 50-150 nm in thickness, serving as counter electrodes 126, are formed on the color filters R, G, and B, and an alignment film 128 of approximately 30-120 nm in thickness is formed on the counter electrodes 126. Further, bumps 120 and sub-bumps 120b, each of approximately 1.2-1.8 μm in thickness, are formed on the counter electrodes 126 and are covered by the alignment film 128.

A liquid crystal layer LC is provided between the TFT substrate and the CF substrate.

[Patent Document 1]
Japanese Unexamined Patent Publication No. 83517/2001 (published on Mar. 30, 2001)
[Patent Document 2]
Japanese Unexamined Patent Publication No. 281693/2001 (published on Oct. 10, 2001)

DISCLOSURE OF INVENTION

However, generally, the data signal lines 112 and the scanning signal lines that are described in Patent Document 1 are formed through sputtering and therefore there is a possibility that a foreign matter 112a in FIG. 10 attaches while sputtering. The foreign matter is made in such a manner that a dust or the like from vacuum process equipment or outside serves as a core and is deposited in combination with a metal that is a material of the sputtering. Consequently, the foreign matter exhibits conductivity.

Further, as illustrated in FIG. 10, the data signal lines 112 and the scanning signal lines are formed to face the black matrixes 134. Since ends of the color filters R, G, and B are patterned while climbing over the black matrixes 134, the ends of the color filters R, G, and B rise, and corresponding portions of the counter electrodes 126 and the alignment layer 128 have shapes according to the rising.

Therefore, in a case where the foreign matter attached to the data signal lines 112 or the scanning signal lines are large, when the TFT substrate and the CF substrate are combined with each other to form a liquid crystal display panel, the foreign matter contacts the counter electrode 126 near the black matrixes 134, which results in electric leakage.

The present invention was made in view of the foregoing problem. An object of the present invention is to realize a display panel and a display device, where even when a foreign matter attaches to a line electrode such as a data signal line and a scanning signal line, electric leakage does not occur between the line electrode and a counter electrode.

In order to solve the foregoing problem, a display panel of the present invention includes first and second substrates that face each other, the first substrate including, on a surface facing the second substrate, line electrodes for transmitting signals to pixels and pixel electrodes which are provided for individual pixels and to which the signals are transmitted via the line electrodes, the second substrate including, on a surface facing the first substrate, black matrixes positioned to wholly face predetermined one or more of the line electrodes, color filters positioned between the black matrixes, and counter electrodes positioned to be closer to the first substrate than the black matrixes and the color filters are and to face the pixel electrodes, the counter electrodes being designed not to cover at least a part of a first area out of an area of the black matrixes that is closer to the first substrate, the first area being right above the predetermined one or more of the line electrodes at a side of the second substrate.

With the arrangement, the second substrate is designed such that in the area of the black matrixes that is closer to the first substrate, the counter electrodes do not cover at least a part of the first area out of the area of the black matrixes that is closer to the first substrate, the first area being right above the predetermined one or more (e.g., a least one of data signal lines and scanning signal lines) of the line electrodes at a side of the second substrate. Therefore, even when a foreign matter attaches to the line electrodes that face the black matrixes, the foreign matter does not contact the counter electrodes as long as the counter electrodes do not exist at positions facing the foreign matter.

Thus, it is possible to realize a display panel in which even when a foreign matter attaches to line electrodes such as data signal lines and scanning signal lines, electric leakage between the line electrodes and the counter electrodes can be prevented.

In order to solve the foregoing problem, the display panel of the present invention is arranged such that the black matrixes extend in a predetermined direction on a display area of the second substrate, the counter electrodes are designed not to cover at least the first area out of the area of the black matrixes that is closer to the first substrate, and the counter electrodes are electrically connected with each other via a frame area (peripheral area) of the display panel.

With the invention, the black matrixes extend in a predetermined direction on the display area of the second substrate, and therefore the wiring electrodes facing the black matrixes are wirings that extend in the predetermined direction on the display area of the first substrate (e.g., one of the data signal lines and the scanning signal lines). Further, the counter electrodes are designed not to cover at least the first area out of the area of the black matrixes that is closer to the first substrate. In this case, the counter electrodes are separated from each other with the black matrixes therebetween on the display area, but the counter electrodes exist continuously in the predetermined direction. Therefore, by electrically connecting the counter electrodes via the frame area of the second substrate, the counter electrodes can serve as a common electrode for individual pixel electrodes.

Thus, with the present invention, in a case where the black matrixes extend in the predetermined direction on the display area of the second substrate, the counter electrodes are not mounted on all portions facing the line electrodes out of the area of the black matrixes that is closer to the first substrate, and consequently a foreign matter attached to the line electrodes is prevented from contacting the counter electrodes, and at the same time the counter electrodes serve as a common electrode.

In order to solve the foregoing problem, the display panel of the present invention is arranged so that the counter electrodes are designed to cover at least a part of the first area out of the area of the black matrixes that is closer to the first substrate, and the counter electrodes are electrically connected with each other via a portion covering the first area.

With the invention, the counter electrodes are provided to cover at least a part of the first area and not to cover the other part out of the area of the black matrixes that is closer to the first substrate. When the black matrixes are provided lengthwise and crosswise on the display area of the second substrate, the counter electrodes are separated from each other with respect to each pixel. However, when the counter electrodes cover a part of the first area, the counter electrodes corresponding to adjacent pixels can be connected with each other via the covered part so that the counter electrodes serve as a common electrode. Therefore, the counter electrodes are electrically connected with each other via the portion covering the first area.

Thus, with the present invention, in a case where the black matrixes are provided lengthwise and crosswise, when a part of the portion facing the line electrode out of the area of the black matrixes closer to the first substrate is provided with a counter electrode and other part is not provided with the counter electrode, it is possible to prevent a foreign matter attached to the line electrode from contacting the counter electrode and at the same time to cause the counter electrode to serve as a common electrode.

In order to solve the foregoing problem, the display panel of the present invention is arranged so that each of the black matrixes has a line width larger than that of the predetermined one or more of the line electrodes, and a portion not covered by the counter electrodes out of the area of the black matrixes that is closer to the first substrate has a width in a direction perpendicular to a direction in which the black matrixes extend, the width being smaller than a line width of the black matrixes.

With the invention, a portion not covered by the counter electrodes out of the area of the black matrixes that is closer to the first substrate has a width in a direction perpendicular to a direction in which the black matrixes extend, the width being larger than the line width of the line electrode facing the black matrixes and smaller than a line width of the black matrixes. This allows causing the foreign matter attached to the line electrode to be less likely to contact the counter electrode as well as causing light leaking from the first substrate to the second substrate to be more likely to be prevented by the black matrixes.

In order to solve the foregoing problem, the display panel of the present invention is arranged so that at a cross section of the display panel which cross section (i) passes the portion not covered by the counter electrodes out of the area of the black matrixes that is closer to the first substrate, (ii) is in a direction perpendicular to a direction in which the black matrixes extend, and (iii) is perpendicular to a substrate surface, when seen from a direction perpendicular to the substrate surface, the portion not covered by the counter electrodes out of the area of the black matrixes that is closer to the first substrate contains an area of the predetermined one or more of the line electrodes.

With the invention, a foreign matter attached to the line electrodes is particularly less likely to contact the counter electrodes.

In order to solve the foregoing problem, the display panel of the present invention is arranged so that at a cross section of the display panel which cross section (i) passes the portion not covered by the counter electrodes out of the area of the black matrixes that is closer to the first substrate, (ii) is in a direction perpendicular to a direction in which the black matrixes extend, and (iii) is perpendicular to a substrate surface, when seen from a direction perpendicular to the substrate surface, an area of the black matrixes contains the portion not covered by the counter electrodes out of the area of the black matrixes that is closer to the first substrate.

With the invention, light having leaked from the first substrate to the second substrate via a position where the counter electrodes are not provided is particularly likely to be prevented by the black matrixes.

In order to solve the foregoing problem, the display panel of the present invention is arranged so that the first substrate is provided with a light shield film for preventing light from reaching an area adjacent to the predetermined one or more of the line electrodes.

With the invention, even when portions where the counter electrodes are not provided cause leakage of light from the first substrate to an area adjacent to the black matrixes, providing a light shield film on the line electrode of the first substrate so as to be opposite to the second substrate allows preventing light from reaching the area adjacent to the line electrode. Thus, it is possible to surely prevent leakage of light from the first substrate to the second substrate.

In order to solve the foregoing problem, a display panel of the present invention includes first and second substrates that face each other, the first substrate including, on a surface facing the second substrate, line electrodes for transmitting signals to pixels and pixel electrodes which are provided for individual pixels and to which the signals are transmitted via the line electrodes, the second substrate including, on a surface facing the first substrate, black matrixes positioned to wholly face predetermined one or more of the line electrodes, color filters positioned between the black matrixes, and counter electrodes positioned to be closer to the first substrate than the black matrixes and the color filters are and to face the pixel electrodes, an insulating film for covering a first area that is an area right above the predetermined one or more of the line electrodes at a side of the second substrate is provided in such a manner as to be closer to the first substrate than the counter electrodes of the second substrate are.

With the invention, the insulating film for covering the first area right above the predetermined one or more (e.g., at least one of or both of data signal lines and scanning signal lines) of the line electrodes at a side of the second substrate is provided in such a manner as to be closer to the first substrate than the counter electrodes of the second substrate are. Therefore, even when a foreign matter attaches to the line electrodes that face the black matrixes, portions facing the line electrodes are protected by the insulating film, so that the foreign matter does not contact the counter electrode.

Thus, it is possible to realize a display panel where even when a foreign matter attaches to a line electrode such as a data signal line and a scanning signal line, electric leakage does not occur between the line electrode and a counter electrode.

In order to solve the foregoing problem, the display panel of the present invention is arranged so that a portion covered by the insulating film has a width in a direction perpendicular to a direction in which the black matrixes extend, the width being larger than a line width of the black matrixes.

With the invention, by setting the width of the insulating film to be larger than the line width of the black matrix, it is possible to widely protect the counter electrodes from a foreign matter attached to the line electrodes.

In order to solve the foregoing problem, the display panel of the present invention is arranged so that at a cross section of the display panel which cross section (i) passes a portion covered by the insulating film, (ii) is in a direction perpendicular to a direction in which the black matrixes extend, and (iii) is perpendicular to a substrate surface, when seen from a direction perpendicular to the substrate surface, the portion covered by the insulating film contains an area of the black matrixes.

With the invention, it is possible to widely protect the counter electrodes from a foreign matter attached to the line electrodes.

In order to solve the foregoing problem, the display panel of the present invention is arranged so that the predetermined one or more of the line electrodes are data signal lines.

With the invention, it is possible to prevent a foreign matter attached to the data signal line from contacting the counter electrode.

In order to solve the foregoing problem, the display panel of the present invention is arranged so that the predetermined one or more of the line electrodes are scanning signal lines.

With the invention, it is possible to prevent a foreign matter attached to the scanning signal line from contacting the counter electrode.

In order to solve the foregoing problem, the display panel of the present invention is arranged so as to further include a liquid crystal layer between the first and second substrates.

With the invention, it is possible to prevent electric leakage between the line electrode and the counter electrode in a liquid crystal display panel.

In order to solve the foregoing problem, a display device of the present invention includes the display panel.

With the invention, it is possible to realize a display device where electric leakage due to defective production is less likely to occur.

Additional objects, features, and strengths of the present invention will be made clear by the description below. Further, the advantages of the present invention will be evident from the following explanation in reference to the drawings.

BRIEF DESCRIPTION OF DRAWINGS

FIG. 2(a) illustrates a case where the black matrixes have a stripe shape. FIG. 2(b) is a case where the black matrixes have a lattice shape.

FIGS. 3(a) to 3(e) indicate that the CF substrate is produced in this order.

FIG. 6 is a plan drawing illustrating patterns of black matrixes and counter electrodes. FIG. 6(a) illustrates a case where the black matrixes have a stripe shape. FIG. 6(b) is a case where the black matrixes have a lattice shape.

FIGS. 7(a) to 7(e) indicate that the CF substrate is produced in this order.

REFERENCE NUMERALS

1: TFT substrate (first substrate)
2, 3: CF substrate (second substrate)
13: source line (line electrode)
15: pixel electrode
22: black matrix
24: counter electrode
GL: gate line (line electrode)
SL: source line (line electrode)

BEST MODE FOR CARRYING OUT THE INVENTION

The following explains an embodiment of the present invention with reference to FIGS. 1 to 8.

Figure 8:
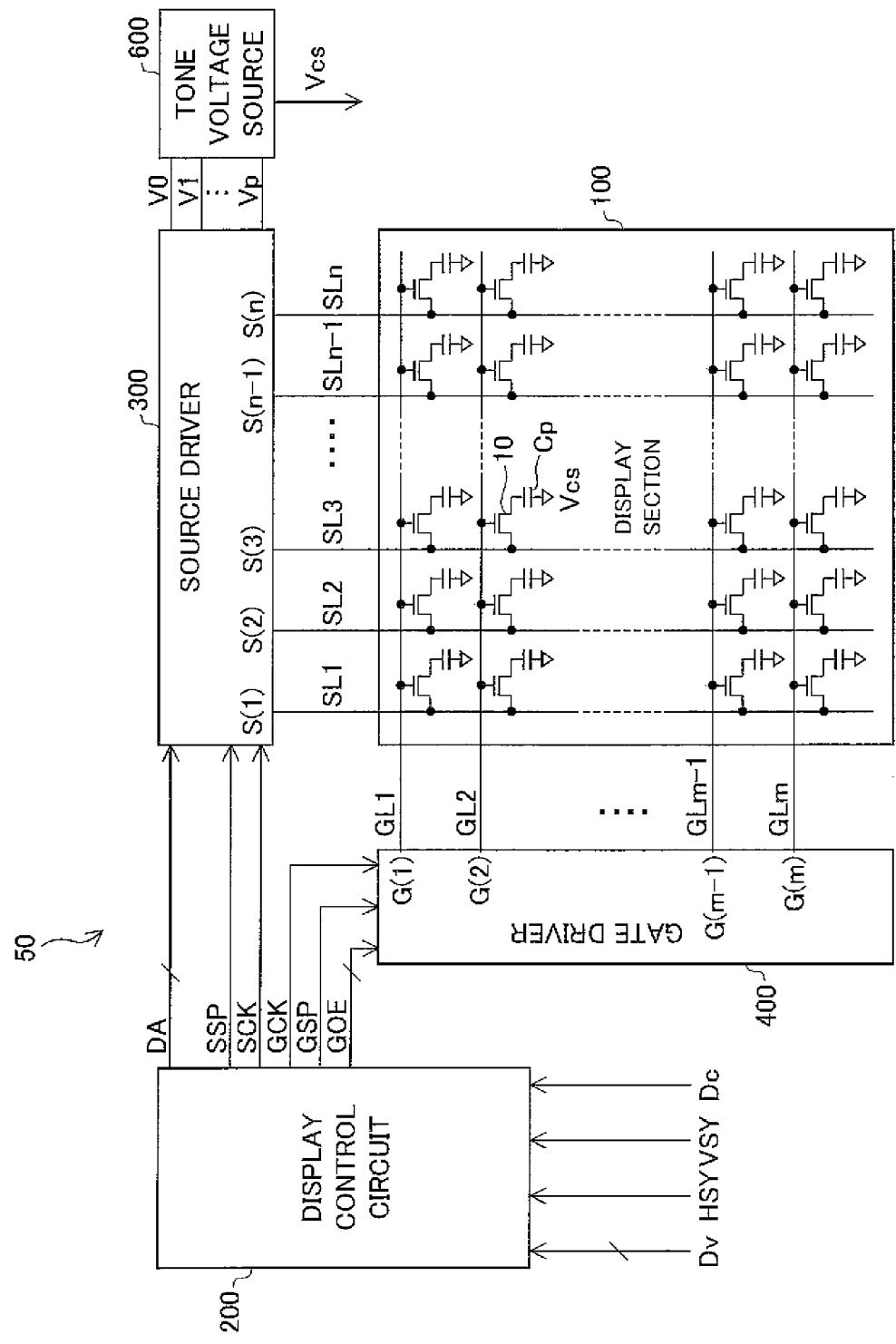
FIG. 8 is a block diagram illustrating a configuration of a display device in accordance with an embodiment of the present invention.
Figure 9:
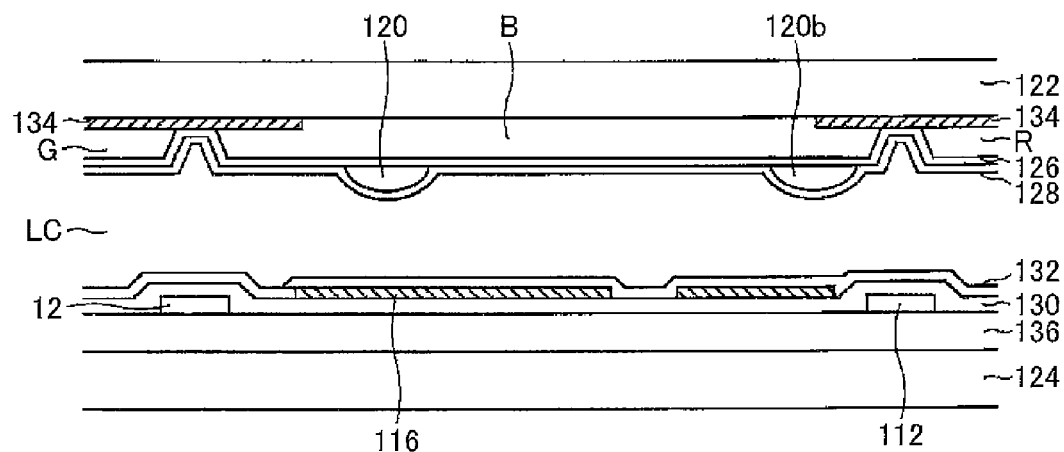
FIG. 9 is a cross sectional drawing illustrating a configuration of a conventional pixel formation section.
Figure 10:
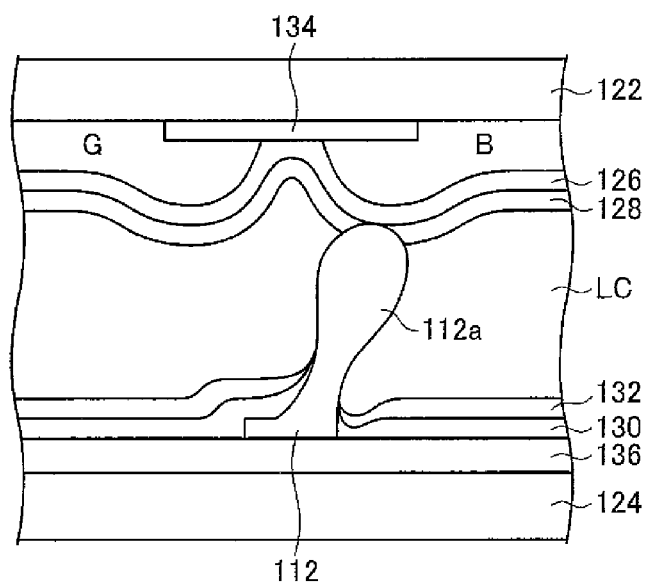
FIG. 10 is a cross sectional drawing illustrating the pixel formation section of FIG. 9 where a foreign matter attaches to a source line.

FIG. 8 illustrates a configuration of a liquid crystal display device (display device) 50 of the present embodiment in combination with an equivalent circuit of a display section of the liquid crystal display device 50. The liquid crystal display device 50 includes: a source driver 300 serving as a data signal line driving circuit; a gate driver 400 serving as a scanning signal line driving circuit; a display section 100 in an active matrix mode; a display control circuit 200 for controlling the source driver 300 and the gate driver 400; and a tone voltage source 600.

The display section 100 of the liquid crystal display device 50 includes: gate lines GL1-GLm serving as a plurality of (m) scanning signal lines (line electrodes for transmitting signals to pixels); source lines SL1-SLn serving as a plurality of (n) data signal lines (line electrodes for transmitting signals to pixels) that cross the gate lines GL1-GLm; and a plurality of (m×n) pixel formation sections provided to correspond to cross points of the gate lines GL1-GLm and the source lines SL1-SLn. These pixel formation sections are positioned in a matrix manner to form a pixel array, and each pixel formation section includes: a TFT 10 that is a switching element whose gate terminal is connected with a gate line GLj passing through a corresponding cross point and whose source terminal is connected with a source line SLi passing through the corresponding cross point; a pixel electrode connected with a drain terminal of the TFT 10; a counter electrode that is common with respect to the plurality of pixel formation sections; and a liquid crystal layer provided between the pixel electrode and the counter electrode. A liquid crystal capacitor made of the pixel electrode, the liquid crystal layer, and the counter electrode serves as a pixel capacitor Cp. A storage capacitor formed between the pixel electrode and other electrode may be added to the pixel capacitor Cp.

A potential corresponding to an image to be displayed is given by the source driver 300 and the gate driver 400 to a pixel electrode in each pixel formation section. Thus, a voltage corresponding to a difference in potential between the pixel electrode and the counter electrode is applied across a liquid crystal, application of the voltage controls the amount of light that transmits the liquid crystal layer, so that an image is displayed.

The display control circuit 200 receives, from an external signal source, a digital video signal Dv indicative of an image to be displayed, a horizontal synchronization signal HSY and a vertical synchronization signal VSY that correspond to the digital video signal Dv, and a control signal Dc for controlling display operation. In accordance with the signals Dv, HSY, VSY, and Dc, the display control circuit 200 generates and outputs, as a signal for causing the display section 100 to display an image indicated by the digital video signal Dv, a source start pulse signal SSP, a source clock signal SCK, a digital image signal DA indicative of an image to be displayed (a signal corresponding to the video signal Dv), a gate start pulse signal GSP, a gate clock signal GCK, and a gate driver output control signal GOE.

The video signal Dv is subjected to timing adjustment etc., if necessary, in an inner memory, and then is output as the digital image signal DA from the display control circuit 200. The source clock signal SCK is generated as a signal for determining operation timing of a shift register in the source driver 300. The source start pulse signal SSP is generated as a signal which, in accordance with the horizontal synchronization signal HSY, becomes a High level (H level) for a predetermined period with respect to each one horizontal scanning period and is transmitted in the shift register. The gate start pulse signal GSP is generated as a signal which, in accordance with the vertical synchronization signal VSY, becomes a H level for a predetermined period with respect to each one frame period (one vertical scanning period). The gate clock signal GCK is generated in accordance with the horizontal synchronization signal HSY. The gate driver output control signal GOE is generated in accordance with the horizontal synchronization signal HSY and the control signal Dc.

Out of the signals generated in the display control circuit 200 as described above, the digital image signal DA, the source start pulse signal SSP, and the source clock signal SCK are input to the source driver 300, and the gate start pulse signal GSP, the gate clock signal GCK, and the gate driver output control signal GOE are input to the gate driver 400.

In accordance with the digital image signal DA, the source start pulse signal SSP, and the source clock signal SCK, the source driver 300 serially generates, with respect to each horizontal scanning period, data signals S(1)-S(n) that are analog voltages corresponding to pixel values in individual horizontal scanning lines of an image indicated by the digital image signal DA, and applies these data signals S(1)-S(n) to the source lines SL1-SLn, respectively. Tone reference voltages to be selected as the analog voltage signals S(1)-S(n) are voltages V0-Vp generated by the tone voltage source 600. Further, the tone voltage source 600 generates and outputs a voltage Vcs to be applied to storage capacitor lines.

In accordance with the gate start pulse signal GSP, the gate clock signal GCK, and the gate driver output control signal GOE, the gate driver 400 outputs selection pulses for serially selecting the gate lines GL1-GLm for substantially one horizontal scanning period in each frame period (each vertical scanning period) of the digital image signal DA, in order to write the data signals S(1)-S(n) to the pixel capacitors Cp of individual pixel formation sections.

In the liquid crystal display device 50 with the above configuration, examples of the liquid crystal display panel (display panel) include (1) a panel including the display section 100 made by combining the TFT substrate and the CF substrate and pouring a liquid crystal therebetween, where the source driver 300, the gate driver 400, the display control circuit 200, and the tone voltage source 600 in FIG. 8 are not yet provided, (2) a panel including the display section 100 made by combining the TFT substrate and the CF substrate and pouring a liquid crystal therebetween, where predetermined one or more out of the source driver 300, the gate driver 400, the display control circuit 200, and the tone voltage source 600 in FIG. 8 are mounted as an IC, (3) a panel including the display section 100 made by combining the TFT substrate and the CF substrate and pouring a liquid crystal therebetween, where the source driver 300, the gate driver 400, the display control circuit 200, and the tone voltage source 600 in FIG. 8 are integrally formed with pixels from polycrystalline silicon, CG silicon, etc., and a panel obtained by mounting the display control circuit 200 as an IC in the panel (3).

The following explains examples of a detailed configuration of each pixel formation section.

Example 1

Figure 1:
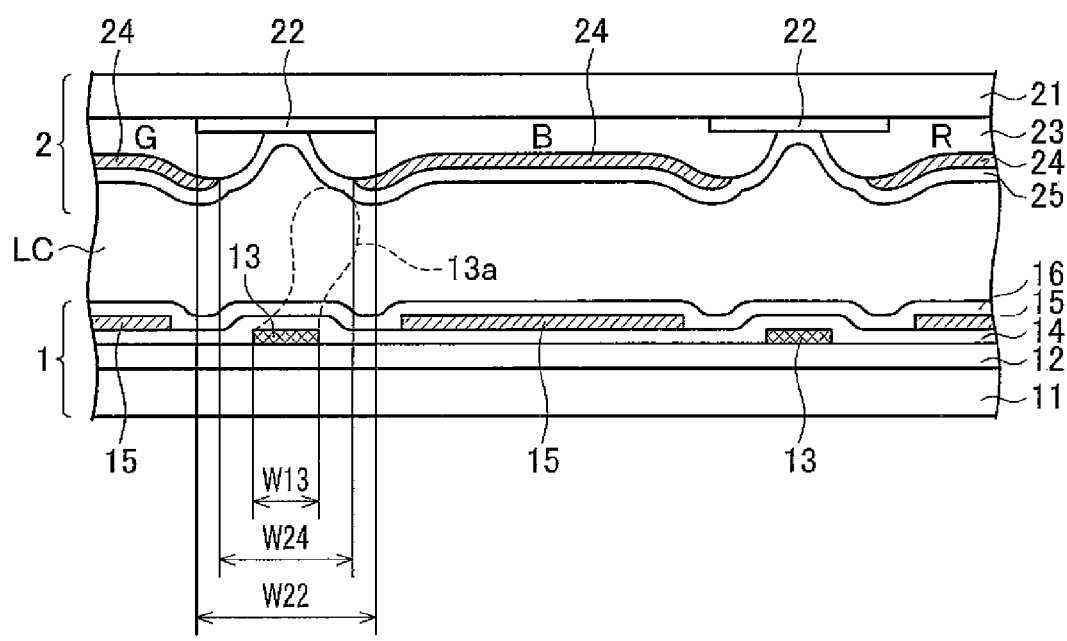
FIG. 1 is a cross sectional drawing illustrating a configuration of a pixel formation section of a display panel, in accordance with Example 1 of an embodiment of the present invention.
Figure 2:
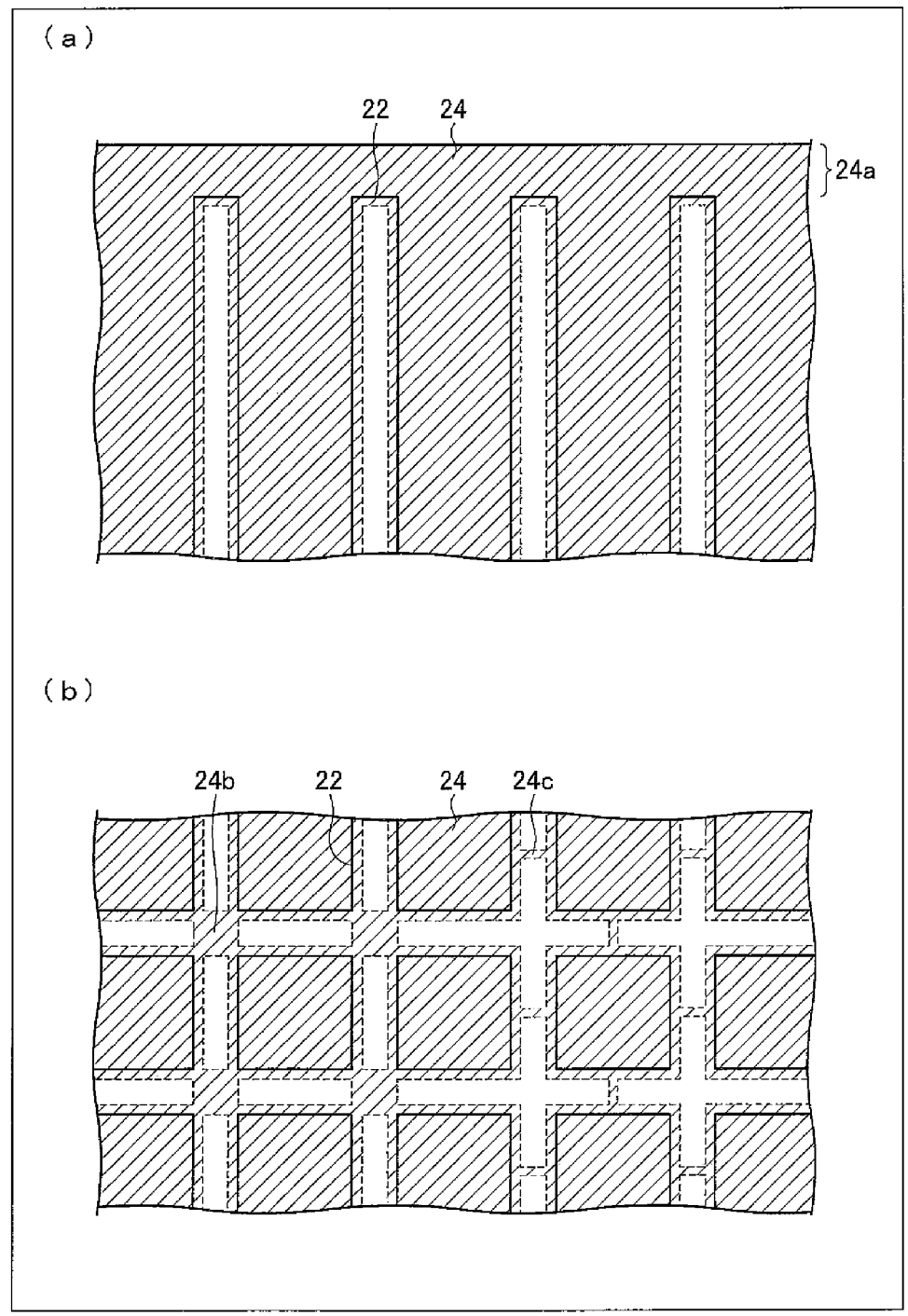
FIG. 2 is a plan drawing illustrating patterns of black matrixes and counter electrodes.
Figure 3:
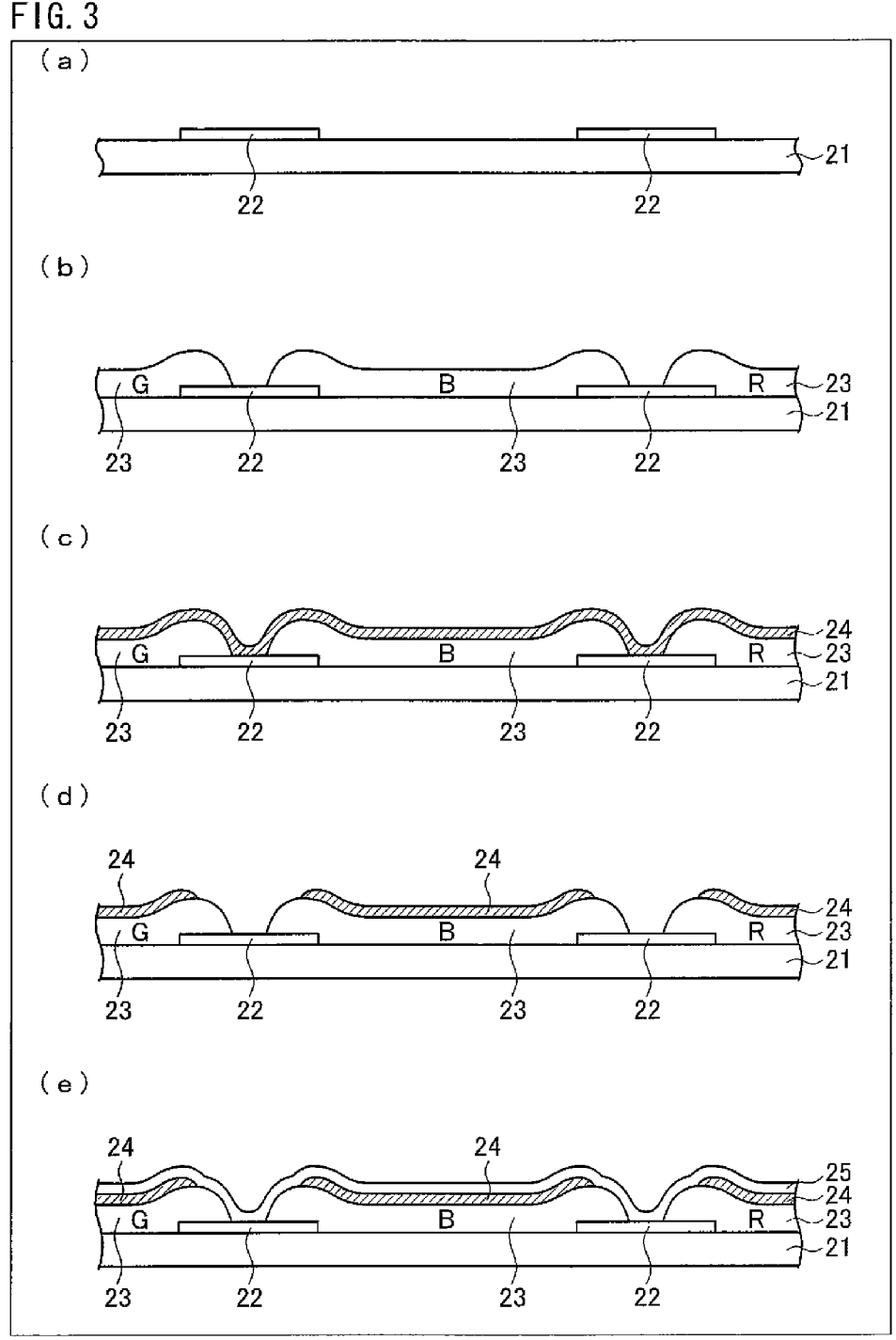
FIG. 3 is a process step drawing illustrating a flow of production steps for a CF substrate used in the pixel formation section of FIG. 1.
Figure 4:
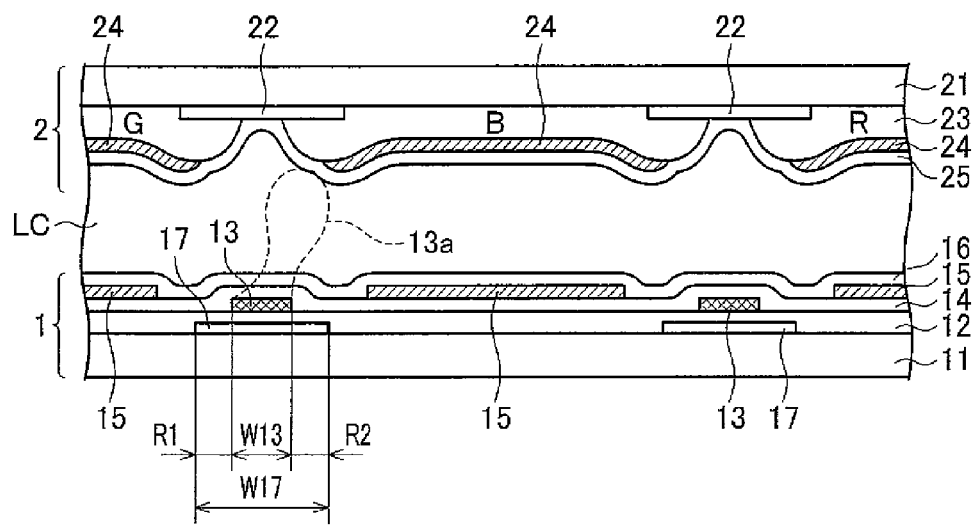
FIG. 4 is a cross sectional drawing illustrating a configuration of a modification example of the pixel formation section in FIG. 1.

FIG. 1 is a cross sectional drawing illustrating a configuration of a pixel formation section of the present example, taken along a line perpendicular to a direction in which source lines SL (shown by a reference numeral 13 here) extend.

The pixel formation section includes a TFT substrate 1, a CF substrate 2, and a liquid crystal layer LC provided between the TFT substrate 1 and the CF substrate 2.

The TFT substrate 1 includes a glass substrate 11, gate electrodes (gate electrodes and gate lines GL of a TFT 10) (not shown), a gate insulating film 12, source lines 13, a passivation film 14, a pixel electrode 15, and an alignment film 16. The TFT substrate 1 has a well-known configuration and can be produced with a well-known technique.

The gate electrode is an Al/Ti laminate film formed on the glass substrate 11 through sputtering. The gate insulating film 12 is an $SiO_2$ film or an $SiN_x$ film formed on the one whole surface of the glass substrate 11 to cover the gate electrodes and the gate lines GL of the TFT 10. The source line 13 is an Al/Ti laminate film formed on the gate insulating film 12 to have a line width W13 through sputtering. In the sputtering step for forming the source line 13, there is a possibility that a foreign matter 13a attaches to the source line 13.

The passivation film 14 is an $SiN_x$ film formed in such a manner as to cover the source line 13 and the layer under the source line 13. The pixel electrode 15 is made of an ITO, formed at each pixel region on the passivation film 14 that is surrounded by the gate lines GL and the source lines 13. The alignment film 16 is a polyimide film formed in such a manner as to cover the pixel electrode 15 and the layer under the pixel electrode 15. A semiconductor layer serving as a channel layer and a conductive layer serving as a source/drain region and a contact layer, that are formed when forming the TFT 10, may remain under the source line 13.

The CF substrate 2 includes a glass substrate 21, black matrixes 22, color filters 23, a counter electrode 24, and an alignment film 25.

An explanation is made as to a configuration of the CF substrate 2 with reference to process step drawings of FIGS. 3(a)-3(e).

First, as illustrated in FIG. 3(a), the black matrixes 22 are formed on the glass substrate 21 to have a line width W22 (see FIG. 1). The line width W22 is larger than the line width W13 of the source line 13. The black matrixes 22 may have a stripe shape that is provided along only the source lines 13 or the gate lines GL as illustrated in a plane drawing of FIG. 2(a), or may have a lattice shape that is provided along both the gate lines GL and the source lines 13 as illustrated in a plane drawing of FIG. 2(b).

Next, as illustrated in FIG. 3(b), the color filters 23 corresponding to R, G, and B, respectively, are formed on pixel regions between the black matrixes 22 on the glass substrate 21. The color filters 23 are patterned so that ends of the color filters 23 climb over the black matrixes 22.

Next, as illustrated in FIG. 3(c), an ITO that will serve as the counter electrode 24 facing at least the pixel electrodes 15 is formed on the one whole surface of the substrate in the state of FIG. 3(b). Then, as illustrated in FIG. 3(d), portions of the ITO that are above the black matrixes 22, i.e., portions that would be on one side of the black matrixes 22 closer to the TFT substrate 1 when the TFT substrate 1 and the CF substrate 2 would be combined with each other to form a liquid crystal display panel, are subjected to wet etching, so that extracted patterns that extend in a direction in which the black matrixes 22 extend are formed. The extracted pattern has a width of W24 (see FIG. 1) in a direction perpendicular to a direction in which the black matrixes 22 extend. The width W24 of the extracted pattern is larger than the line width W13 of the source line 13 and smaller than the line width W22 of the black matrixes.

Further, the area with the line width W24 is designed to be positioned within the area with the width W22. That is, at a cross section which (i) passes the portion not covered by the counter electrode 24 out of the area of the black matrixes 22 that is closer to the TFT substrate 1, (ii) is in a direction perpendicular to a direction in which the black matrixes 22 extend, and (iii) is perpendicular to surfaces of the TFT substrate 1 and the CF substrate 2, when seen from a direction perpendicular to the substrate surface, an area of the black matrixes contains the portion not covered by the counter electrode 24 out of the area of the black matrixes 22 that is closer to the TFT substrate.

Thereafter, as illustrated in FIG. 3(e), the alignment film 25 made of polyimide is formed on the one whole surface of the CF substrate 2. Thus, the CF substrate 2 is completed.

The TFT substrate 1 with the above configuration and the CF substrate 2 with the above configuration are caused to face each other and be combined with each other in such a manner that the above configuration on the glass substrate 11 and the above configuration on the glass substrate 21 face each other. Then, a liquid crystal is poured between the TFT substrate 1 and the CF substrate 2 to form a liquid crystal layer LC. Thus, the configuration in FIG. 1 is completed. Here, the source lines 13 at the display area wholly face the black matrixes 22.

Further, an area of the counter electrode 24 with the width W24 of the extracted pattern is designed to contain the area with the line width W13. That is, at a cross section which (i) passes the portion not covered by the counter electrode 24 out of the area of the black matrixes 22 that is closer to the TFT substrate 1, (ii) is in a direction perpendicular to a direction in which the black matrixes 22 extend, and (iii) is perpendicular to surfaces of the TFT substrate 1 and the CF substrate 2, when seen from a direction perpendicular to the substrate surface, an area not covered by the counter electrode 24 out of the area of the black matrixes 22 that is closer to the TFT substrate 1 contains the area of the source line 13.

As described above, examples of the pattern for the black matrixes 22 include a stripe shape as illustrated in FIG. 2(a) and a lattice shape as illustrated in FIG. 2(b).

In a case where the black matrixes 22 have the pattern of FIG. 2(a) in the configuration of FIG. 1, the black matrixes 22 extend, on a display area of the liquid crystal display panel, in one direction that is along a direction in which the source lines 13 extend. As illustrated in FIG. 1, the extracted pattern area with the width W24 of the counter electrode 24 contains the area with the line width W13, and therefore the area with the width 24 contains, at an area of the black matrixes 22 that is closer to the TFT substrate 1, at least a first area that is an area right above the source lines 13 at a side of the CF substrate 2. Thus, the counter electrode 24 is provided not to cover at least the first area.

In this case, as illustrated in FIG. 2(a), in the display area, the counter electrodes 24 are separated from each other with the black matrixes 22 therebetween. However, the counter electrodes 24 extend continuously in a direction in which the source lines 13 extend. Therefore, the counter electrodes 24 are connected with each other to be one electrode with use of a frame area portion 24a provided at a frame area of a liquid crystal display panel. Thus, the counter electrodes 24 are connected with each other to be one electrode with use of the frame area, allowing the counter electrodes 24 to serve as a common electrode for the pixel electrodes 15.

Further, in a case where the black matrixes 22 extend in a direction along a direction in which the gate lines GL extend, the gate lines GL may be provided on the glass substrate 11 so as to be on an area facing the black matrixes 22 in FIG. 1. Consequently, as with the case of the source lines 13, the counter electrodes 24 are connected with each other via the frame area.

Further, in a case where the black matrixes 22 have the pattern of FIG. 2(b) in the configuration of FIG. 1, the black matrixes 22 are provided lengthwise and crosswise. Therefore, when the counter electrodes 24 are provided on areas of the black matrixes 22 that are closer to the TFT substrate 1 in such a manner as not to cover a first area that faces at least the source lilies 13 and the gate lines GL, the counter electrodes 24 are separated into areas corresponding to pixels. As for the gate lines GL, the gate lines GL may be provided on the glass substrate 11 so as to be on an area facing the black matrixes 22 in FIG. 1.

However, when the counter electrodes 24 cover a part of the first area, it is possible to connect the counter electrodes 24 corresponding to adjacent pixels with use of the covered part so that the counter electrodes 24 serve as a common electrode. For that reason, as shown by reference numerals 24b and 24c in FIG. 2(b), the counter electrodes 24 are electrically connected with each other via the covered part. The part 24b is an area of a lattice point of the black matrixes 22 and is a part where counter electrodes 24 of four pixels surrounding the lattice point are connected with one another. The part 24c is an area between lattice points of the black matrixes 22 and is a part where the counter electrodes 24 of two pixels adjacent to the lattice point are bridged.

As described above, in the present example, the CF substrate 2 is designed such that at the area of the black matrixes 22 that is closer the TFT substrate 1, the counter electrode 24 does not cover at least the first area that is an area right above a predetermined one or more of line electrodes (e.g., at least one or both of the source lines 13 and the gate lines GL) at a side of the CF substrate 2. Consequently, even when the foreign matter 13a attaches to the line electrode that faces the black matrixes 22, the foreign matter 13a does not attach to the counter electrode 24 as long as the counter electrode 24 does not exist at a position facing the foreign matter 13a.

As described above, the present example realizes a liquid crystal display panel in which even when the foreign matter 13a attaches to the line electrode such as the source line 13 and the gate line GL, electric leakage between the line electrode and the counter electrode 24 does not occur.

Further, in a case where the black matrixes 22 extend in a predetermined direction on the display area of the CF substrate 2 as illustrated in FIG. 2(a), the counter electrodes 24 are not provided at all portions of the black matrixes 22 closer to the TFT substrate 1 which portions face the source line 13 or the gate line GL, so that the foreign matter 13a attached to the source line 13 or the gate line GL does not contact the counter electrode 24. Thus, the counter electrode 24 can serve as a common electrode.

Further, in a case where the black matrixes 22 are provided lengthwise and crosswise as illustrated in FIG. 2(b), the counter electrodes 24 are provided at a part of portions of the black matrixes 22 closer to the TFT substrate 1 which portions face the source line 13 and the gate line GL and the counter electrodes 24 are not provided at another part of the portions, so that the foreign matter 13a attached to the source line 13 or the gate line GL does not contact the counter electrodes 24. Thus, the counter electrodes 24 can serve as a common electrode.

Further, the present example may be arranged so that regions R1 and R2 adjacent to the source line 13 are shielded by a light shield film 17 from light. The light shield film is made of the same material as that of the black matrixes 22, and is formed on the glass substrate 11. The width W17 of the light shield film 17 is larger than the line width W13, and the area with the width W17 contains the area with the line width W13 therein so as to shield the regions R1 and R2 from light. The position to provide the light shield film 17 is not particularly limited as long as the light shield film 17 shields light near the source line 13 or the gate line GL of the TFT substrate 1.

As described above, even when a portion where the counter electrodes 24 are not provided allows light to leak from the TFT substrate 1 to the areas adjacent to the black matrixes 22, providing the light shield film 17 in the TFT substrate 1 prevents light from reaching the areas adjacent to the source line 13 or the gate line GL. This allows surely preventing light from leaking from the TFT substrate 1 to the CF substrate 2.

Example 2

Figure 5:
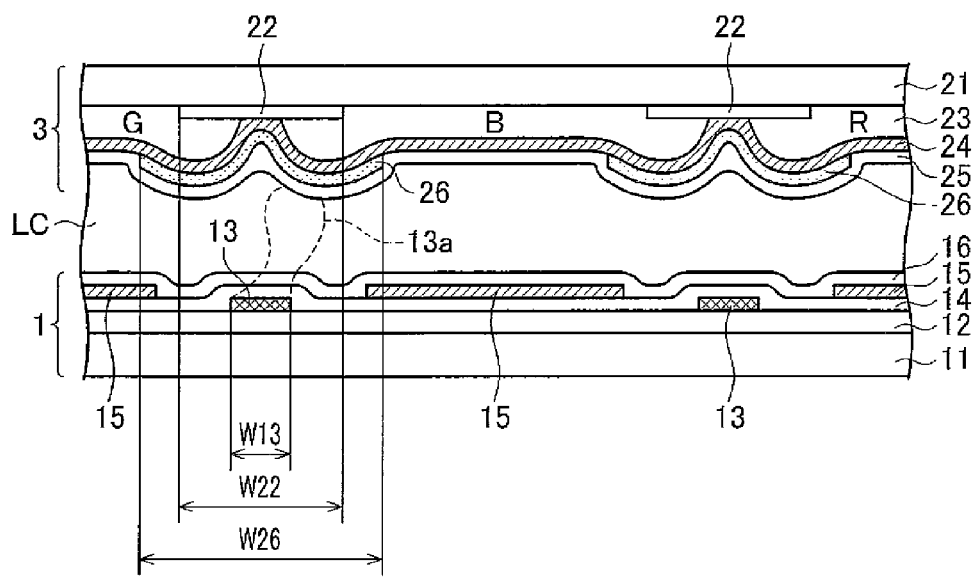
FIG. 5 is a cross sectional drawing illustrating a configuration of a pixel formation section of a display panel, in accordance with Example 2 of an embodiment of the present invention.
Figure 7:
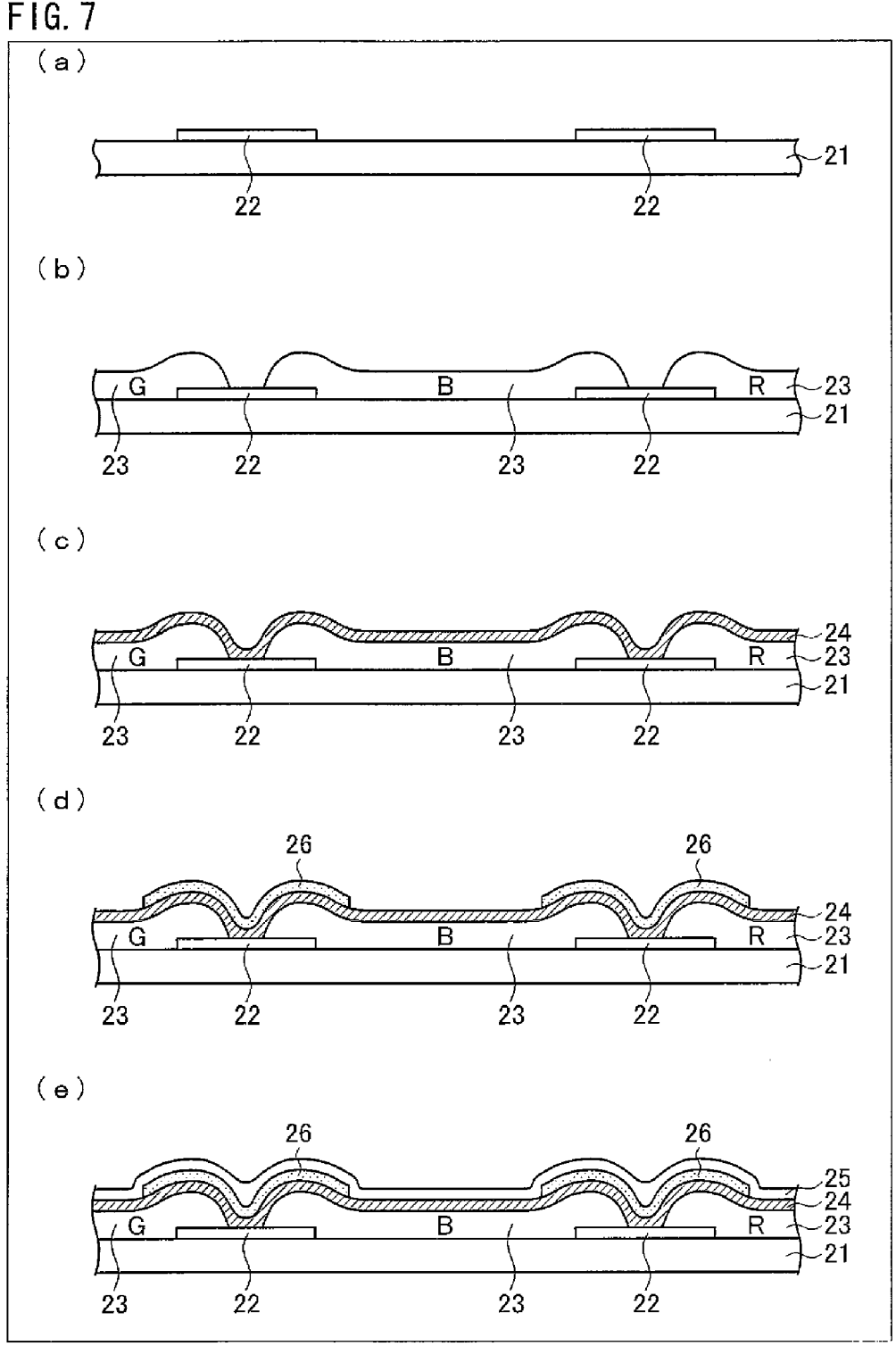
FIG. 7 is a process step drawing illustrating a flow of production steps for a CF substrate used in the pixel formation section of FIG. 5.

FIG. 5 is a cross sectional drawing of a configuration of a pixel formation section of the present example, taken along a line perpendicular to a direction in which source lines SL (shown by a reference numeral 13 here) extend.

The pixel formation section includes a TFT substrate 1, a CF substrate 3, and a liquid crystal layer LC provided between the TFT substrate 1 and the CF substrate 3.

The TFT substrate 1 includes a glass substrate 11, gate electrodes (gate electrodes and gate lines GL of a TFT 10) (not shown), a gate insulating film 12, source lines 13, a passivation film 14, a pixel electrode 15, and an alignment film 16. The TFT substrate 1 has a well-known configuration and can be produced with a well-known technique.

The gate electrode is an Al/Ti laminate film formed on the glass substrate 11 through sputtering. The gate insulating film 12 is an $SiO_2$ film or an $SiN_x$ film formed on the one whole surface of the glass substrate 11 to cover the gate electrodes and the gate lines GL of the TFT 10. The source line 13 is an Al/Ti laminate film formed on the gate insulating film 12 to have a line width W13 through sputtering. In the sputtering step for forming the source line 13, there is a possibility that a foreign matter 13a attaches to the source line 13.

The passivation film 14 is an $SiN_x$ film formed in such a manner as to cover the source line 13 and the layer under the source line 13. The pixel electrode 15 is made of an ITO, formed at each pixel region on the passivation film 14 that is surrounded by the gate lines GL and the source lines 13. The alignment film 16 is a polyimide film formed in such a manner as to cover the pixel electrode 15 and the layer under the pixel electrode 15. A semiconductor layer serving as a channel layer and a conductive layer serving as a source/drain region and a contact layer, that are formed when forming the TFT 10, may remain under the source line 13.

The CF substrate 3 includes a glass substrate 21, black matrixes 22, color filters 23, a counter electrode 24, an alignment film 25, and an insulating film 26.

An explanation is made as to a configuration of the CF substrate 3 with reference to process step drawings of FIGS. 7(a)-7(e).

First, as illustrated in FIG. 7(a), the black matrixes 22 are formed on the glass substrate 21 to have a line width W22 (see FIG. 5). The line width W22 is larger than the line width W13 of the source line 13. The black matrixes 22 may have a stripe shape that is provided along only the source lines 13 or the gate lines GL as illustrated in a plane drawing of FIG. 6(a), or may have a lattice shape that is provided along both the gate lines GL and the source lines 13 as illustrated in a plane drawing of FIG. 6(b).

Next, as illustrated in FIG. 7(b), the color filters 23 corresponding to R, G, and B, respectively, are formed on pixel regions between the black matrixes 22 on the glass substrate 21. The color filters 23 are patterned so that ends of the color filters 23 climb over the black matrixes 22.

Next, as illustrated in FIG. 7(c), an ITO that will serve as the counter electrode 24 facing at least the pixel electrodes 15 is formed on the one whole surface of the substrate in the state of FIG. 7(b).

Then, as illustrated in FIG. 7(d), the insulating film 26 is formed on the counter electrode 24, and the insulating film 26 is removed except for portions positioned above the black matrixes 22, i.e., portions that would be on the TFT substrate 1 side of the black matrixes 22 when the TFT substrate 1 and the CF substrate 2 would be combined with each other, thereby forming a pattern with the width W26 (see FIG. 5) that extends in a direction in which the black matrixes 22 extend. Here, the width W26 of the pattern in a direction perpendicular to a direction in which the black matrixes 22 extend is larger than the line width W22 of the black matrix 22. However, the width W26 is not particularly limited as long as the width W26 is larger than the line width W13 of the source line 13.

Here, the area with the width W26 contains the area with the line width W22. That is, at a cross section which (i) passes a portion covered by the insulating film 26, (ii) is in a direction perpendicular to a direction in which the black matrixes 22 extend, and (iii) is perpendicular to surfaces of the TFT substrate 1 and the CF substrate 2, when seen from a direction perpendicular to the substrate surface, the portion covered by the insulating film 26 contains an area of the black matrixes 22.

The material for the insulating film 26 is preferably a transparent insulating film. A passivation film material such as $SiN_x$, an acrylic photospacer material, acrylic rib material, JAS (acrylic transparent insulating film) etc. may be used. Further, resistance of the insulating film 26 is preferably several MΩ or more when measured in a film thickness direction, and sheet resistance of the insulating film 26 is preferably several Ω/□ or more.

The gate line GL may be provided in such a manner that the gate line GL is provided on the glass substrate 11 so as to be on an area that faces the black matrixes 22 in FIG. 5. The insulating film 26 is formed in the same manner as the source line 13.

Then, as illustrated in FIG. 7(e), the alignment film 25 made of polyimide is formed on the substrate in the state of FIG. 7(d). Since the alignment film 25 is formed after the insulating film 26 is formed, it is possible to avoid damage on the alignment film 25 due to patterning of the insulating film 26 through etching. Further, when the insulating film 26 is made of a rib material, less number of patternings are required, which prevents the increase in the number of process steps.

Thus, the CF substrate 3 is completed.

As described above, the pattern of the black matrix 22 may have a stripe-shape as illustrated in FIG. 6(a) or a lattice-shape as illustrated in FIG. 6(b). Since the counter electrodes 24 are electrically connected with each other on the one whole surface of the display area of the liquid crystal display panel, the counter electrodes 24 can be used as a common electrode.

The TFT substrate 1 with the above configuration and the CF substrate 3 with the above configuration are caused to face each other and be combined with each other in such a manner that the above configuration on the glass substrate 11 and the above configuration on the glass substrate 21 face each other. Then, a liquid crystal is poured between the TFT substrate 1 and the CF substrate 3 to form a liquid crystal layer LC. Thus, the configuration in FIG. 5 is completed. Here, the source line 13 at the display area wholly faces the black matrixes 22. Further, the area with the width W26 of the insulating film 26 contains the area with the line width W13 therein. Consequently, the insulating film 26 covers the first area that is an area right above the source line 13 and the gate line GL at a side of the CF substrate 3 that face at least the black matrixes 22 on the CF substrate 3 to be closer to the TFT substrate 1 than the counter electrodes 24 are.

As described above, in the present example, the insulating film 26 for covering at least the first area right above the predetermined one or more of the wiring electrodes (e.g., one or both of the source line 13 and the gate line GL) at a side of the CF substrate 3 is provided on the CF substrate 3 so as to be closer to the TFT substrate 1 than the counter electrodes 24 are. Consequently, even when the foreign matter 13a attaches to the line electrode that faces the black matrixes 22, the foreign matter 13a does not attach to the counter electrode 24 since the portion facing the foreign matter 13a is protected by the insulating film 26.

This realizes a liquid crystal display panel in which even when the foreign matter 13a attaches to the line electrode such as the source line 13 and the gate line GL, electric leakage between the line electrode and the counter electrode 24 is prevented.

Further, as illustrated in FIG. 5, by setting the width W26 of the insulating film 26 to be larger than the line width W22 of the black matrix 22, it is possible to protect a large part of the counter electrode 24 from the foreign matter 13a.

The present embodiment was explained above. In the display device produced in the aforementioned manner, electric leakage due to defective production is less likely to occur. The display panel and the display device used in the present embodiment may employ a display element such as an organic EL element, a dielectric fluid, and electrochromic, as well as a liquid crystal.

The present invention is not limited to the above embodiments, and a variety of modifications are possible within the scope of the following claims, and embodiments obtained by combining technical means respectively disclosed in the above embodiments are also within the technical scope of the present invention.

As described above, in the display panel of the present invention, the counter electrodes are designed not to cover at least a part of a first area out of an area of the black matrixes that is closer to the first substrate, the first area being right above the predetermined one or more of the line electrodes at a side of the second substrate.

With the arrangement, it is possible to realize a display panel in which even when a foreign matter attaches to a line electrode such as a data signal line and a scanning signal line, electric leakage between the line electrode and a counter electrode can be prevented.

Further, as described above, in the display panel of the present invention, an insulating film for covering a first area that is an area right above the predetermined one or more of the line electrodes at a side of the second substrate is provided in such a manner as to be closer to the first substrate than the counter electrodes of the second substrate.

With the arrangement, it is possible to realize a display panel in which even when a foreign matter attaches to a line electrode such as a data signal line and a scanning signal line, electric leakage between the line electrode and a counter electrode can be prevented.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is preferably applicable to a liquid crystal display device.

The invention claimed is:
1. A display panel, comprising:
first and second substrates that face each other,
the first substrate including, on a surface facing the second substrate, line electrodes for transmitting signals to pixels and pixel electrodes which are provided for individual pixels and to which the signals are transmitted via the line electrodes,
the second substrate including, on a surface facing the first substrate,
black matrixes positioned to wholly face predetermined one or more of the line electrodes, and being provided lengthwise and crosswise in a lattice pattern on a display area of the second substrate,
color filters positioned between the black matrixes, and a counter electrode positioned to be closer to the first substrate than the black matrixes and the color filters are and to face the pixel electrodes, the counter electrode being formed on a whole surface of the second substrate except extracted patterns formed at portions above the black matrixes other than areas corresponding to cross points of the lattice pattern, the extracted patterns being areas where the black matrixes are not covered by the counter electrode, and at a cross section of the display panel which cross section (i) passes through one of the extracted patterns, (ii) is in a direction perpendicular to a direction in which the one of the extracted patterns extends, and (iii) is perpendicular to the surface of the first substrate, the one of the extracted patterns is positioned to wholly face a corresponding one of the line electrodes, the width of the one of the extracted patterns is greater than the width of the corresponding one of the line electrodes, and the line width of the corresponding one of the black matrixes is greater than the width of the one of the extracted patterns.

2. The display panel as set forth in claim 1, wherein the first substrate is provided with a light shield film for preventing light from reaching an area adjacent to the predetermined one or more of the line electrodes.

3. The display panel as set forth in claim 1, wherein the predetermined one or more of the line electrodes are data signal lines.

4. The display panel as set forth in claim 1, wherein the predetermined one or more of the line electrodes are scanning signal lines.

5. The display panel as set forth in claim 1, further comprising a liquid crystal layer between the first and second substrates.

6. A display device, comprising a display panel as set forth in claim 1.

* * * * *